United States Patent
Kim et al.

(10) Patent No.: US 8,116,183 B2
(45) Date of Patent: Feb. 14, 2012

(54) METHOD AND APPARATUS FOR PROCESSING DEFECT IN DATA STORAGE MEDIUM

(75) Inventors: Kyung-jin Kim, Uiwang-si (KR); Jae-hyuk Yu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/938,544

(22) Filed: Nov. 3, 2010

(65) Prior Publication Data

US 2011/0103210 A1    May 5, 2011

(30) Foreign Application Priority Data

Nov. 3, 2009   (KR) .................. 10-2009-0105489

(51) Int. Cl.
*G11B 20/18* (2006.01)

(52) U.S. Cl. .................. 369/53.16; 369/53.35; 715/710; 715/758

(58) Field of Classification Search ..... 369/53.15–53.17, 369/53.31, 53.35, 53.36, 47.14, 59.23, 69, 369/45; 714/710, 746, 758, 769, 770
See application file for complete search history.

(56) References Cited

U.S. PATENT DOCUMENTS

| 7,254,748 | B1 | 8/2007 | Wright et al. | |
|---|---|---|---|---|
| 2006/0156180 | A1* | 7/2006 | Kang | 714/758 |
| 2007/0038905 | A1* | 2/2007 | Uno et al. | 714/710 |
| 2007/0263313 | A1* | 11/2007 | Kitamura et al. | 360/69 |
| 2008/0186823 | A1* | 8/2008 | Chu et al. | 369/53.17 |
| 2011/0102932 | A1* | 5/2011 | Yun et al. | 369/53.41 |

FOREIGN PATENT DOCUMENTS

| JP | 05257616 A | 10/1993 |
|---|---|---|
| JP | 2000305860 A | 11/2000 |
| KR | 1020080006361 A | 1/2008 |

* cited by examiner

*Primary Examiner* — Thang Tran
(74) *Attorney, Agent, or Firm* — Volentine & Whitt, PLLC

(57) ABSTRACT

A method of detecting defects of a recording medium comprises detecting a number of error-corrected error correction code symbols in each of a plurality of sectors in the recording medium, classifying sectors having a number of error-corrected ECC symbols greater than a first threshold value as first type defect sectors, calculating moving averages of the numbers of error-corrected ECC symbols in units of a predetermined number of sectors, and classifying sectors that are used to calculate a moving average greater than a second threshold value as second type defect sectors.

20 Claims, 10 Drawing Sheets

METHOD AND APPARATUS FOR PROCESSING DEFECT IN DATA STORAGE MEDIUM

CROSS-REFERENCE TO RELATED APPLICATIONS

This application claims priority under 35 U.S.C. §119 to Korean Patent Application No. 10-2009-0105489 filed on Nov. 3, 2009, the disclosure of which is hereby incorporated by reference in its entirety.

BACKGROUND

Embodiments of the inventive concept relate generally to electronic data storage technologies. More particularly, embodiments of the inventive concept relate to methods and apparatuses for processing defects in a recording medium of a data storage apparatus.

A data storage device stores data in a recording medium and reads data from the recording medium. In response to consumer demand, data storage devices are continually improved to store more data in a more compact space. However, as data storage devices increase in storage capacity and compactness, defects are more likely to occur in the recording media. Consequently, there is a continuing demand for research into technologies to effectively detect and compensate for defects in a recording medium of a data storage device.

SUMMARY

Embodiments of the inventive concept provide methods of processing defects in a recording medium, in which track non-uniformity (TNU) sectors and hard defect sectors of the recording medium are separately detected and compensated for according to their type. Embodiments of the inventive concept also provide apparatuses and storage media for implementing the methods.

According to one embodiment of the inventive concept, a method of processing a defect of a recording medium is provided. The method comprises detecting a number of error-corrected error correction code (ECC) symbols in each of a plurality of sectors of the recording medium, classifying a sector having a number of error-corrected ECC symbols greater than a first threshold value as a first type defect sector, calculating moving averages of the numbers of error-corrected ECC symbols in sector units comprising a predetermined number of sectors, and classifying sectors that belong to sector units having a moving average greater than a second threshold value as second type defect sectors.

In certain embodiments, detecting of the number of error-corrected ECC symbols in each sector comprises reading information recorded in the recording medium in units of tracks and simultaneously from entire sectors of each track.

In certain embodiments, the first threshold value is greater than the second threshold value.

In certain embodiments, the method further comprises screen-processing the sectors that are classified as either first type defect sectors or second type defect sectors to make them inaccessible for reading or writing by a user. In certain embodiments, the screen-processing is executed in a test process.

In certain embodiments, the method further comprises executing a defect compensation process by reallocating a sector classified as a first type defect sector to a spare sector of the recording medium or by correcting an off-track for a sector classified as a second type defect sector, and rewriting information written in the sector classified as the second type defect sector. In certain embodiments, the defect compensation process is executed in a user environment.

In certain embodiments, correcting the off-track for the sector classified as the second type defect sector comprises measuring an off-track amount in the sector classified as the second type defect sector, and correcting an off-track for the sector with the measured off-track amount.

According to another embodiment of the inventive concept, a method of processing a defect contained in a recording medium of a data storage apparatus is provided. The method comprises, during an idle mode of the data storage apparatus, reading information from a region of the recording medium in which a write command has been executed, detecting a number of error-corrected ECC symbols in each of a plurality of sectors of the recording medium based on the information read from the recording medium, classifying a sector whose number of error-corrected ECC symbols is greater than a first threshold value as a first type defect sector, calculating moving averages of the numbers of error-corrected ECC symbols in units of a predetermined number of sectors, and classifying groups of sectors that have a moving average greater than a second threshold value as second type defect sectors. 10.

In certain embodiments, reading the information from the region of the recording medium in which the write command has been executed comprises reading the information in units of tracks and simultaneously from entire sectors of each track.

In certain embodiments, the method further comprises executing a defect compensation process by reallocating the sector classified as a first type defect sector to a spare sector or by correcting an off-track for a sector classified as a second type defect sector, and rewriting information written in the sector determined as the second type defect sector.

According to another embodiment of the inventive concept, a data storage device comprises a recording medium for storing data, a media interface for accessing the recording medium, and a processor. The processor is configured to control the media interface to read information from the recording medium, generate information regarding a number of error-corrected ECC symbols in each of a plurality of sectors of the recording medium based on the information read from the recording medium, classify defect sectors of the recording medium as either hard defect sectors or TNU sectors according to a criteria based on the information regarding the number of error-corrected ECC symbols in each sector, and execute a defect processing operation according to the defect sector classifications.

In certain embodiments, the processor classifies sectors having a number of error-corrected ECC symbols greater than a first threshold value as a hard defect sector, calculates moving averages of the numbers of error-corrected ECC symbols in groups of sectors, and classifies sectors in groups having a moving average greater than a second threshold value as TNU sectors.

In certain embodiments, the processor controls the media interface to perform an ECC scan operation to read the information from the recording medium in units of tracks and simultaneously from entire sectors of each track.

In certain embodiments, in a test process of the data storage device, the processor adds a sector classified as either a hard defect sector or a TNU sector to a defect list to make the sector inaccessible for reading or writing by a user, and controls the media interface to store the defect list in the recording medium.

In certain embodiments, in a user environment, the processor controls the media interface to reallocate a sector classified as a hard defect sector to a spare sector of the recording medium, and to correct an off-track for a sector classified as a TNU sector and execute rewriting of information written in the sector classified as the second type defect sector.

In certain embodiments, the recording medium comprises a magnetic disk.

In certain embodiments, the processor comprises an ECC processing unit configured to detect error-corrected ECC symbols in the information read from the recording medium to generate information regarding the number of error-corrected ECC symbols in each sector of a track of the recording medium, a buffer configured to store the information regarding the number of error-corrected ECC symbols in each sector of the track, a first determination unit configured to compare the information regarding the number of error-corrected ECC symbols with a first threshold value and to classify sectors having a number of error-corrected ECC symbols greater than the first threshold value as hard defect sectors, a moving average calculation unit configured to calculate a moving average of the numbers of error-corrected ECC symbols, a second determination unit configured to compare the information regarding the moving averages with a second threshold value to classify sectors in groups of sectors having a moving average greater than the second threshold value as TNU sectors, wherein the second threshold value is smaller than the first threshold value, and a defect control unit configured to control the media interface to add sectors classified as either hard defect sectors or TNU sectors to a defect list to make the sectors inaccessible for reading or writing by a user, or to reallocate sectors classified as hard defect sectors to a spare sector of the recording medium, in order to correct an off-track for sectors classified as TNU sectors and execute rewriting information written in sectors classified as TNU sectors.

In certain embodiments, during an idle mode of the data storage device, the processor reads information written in a region of the recording medium in which a write command has been executed to detect the number of error-corrected ECC symbols in each of the sectors, classifies the sectors as either hard defect sectors or TNU sectors according to a criteria based on the information regarding the number of error-corrected ECC symbols in each sector, and executes the defect processing operation according to the defect sector classifications.

In certain embodiments, the ECC symbols are generated by Reed Solomon coding.

BRIEF DESCRIPTION OF THE DRAWINGS

The drawings illustrate various embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are provided as teaching examples and should not be construed to limit the scope of the inventive concept.

In the description that follows, defects in a recording medium are classified into two categories. Where a sector includes a data error that cannot be corrected using ECCs or when a data error is highly likely to occur in a sector, this is defined as a first type defect sector. Where a sector includes a region in which distances between tracks are non-uniform, this is defined as a second type defect sector. A sector having a first type defect can be called a "hard defect sector." A sector having a second type defect can be called a "track non-uniformity (TNU) sector." A TNU sector may also be called an "AC TNU sector."

In general, non-uniform distances between tracks can be attributed to an unexpected malfunction in a servo track write or servo copy process, or to an external or internal factor in a user environment.

Certain embodiments of the inventive concept provide methods of detecting types of defects of a recording medium and compensating for the defects in different ways in a test process or in a user environment according to their type.

Figure 1:
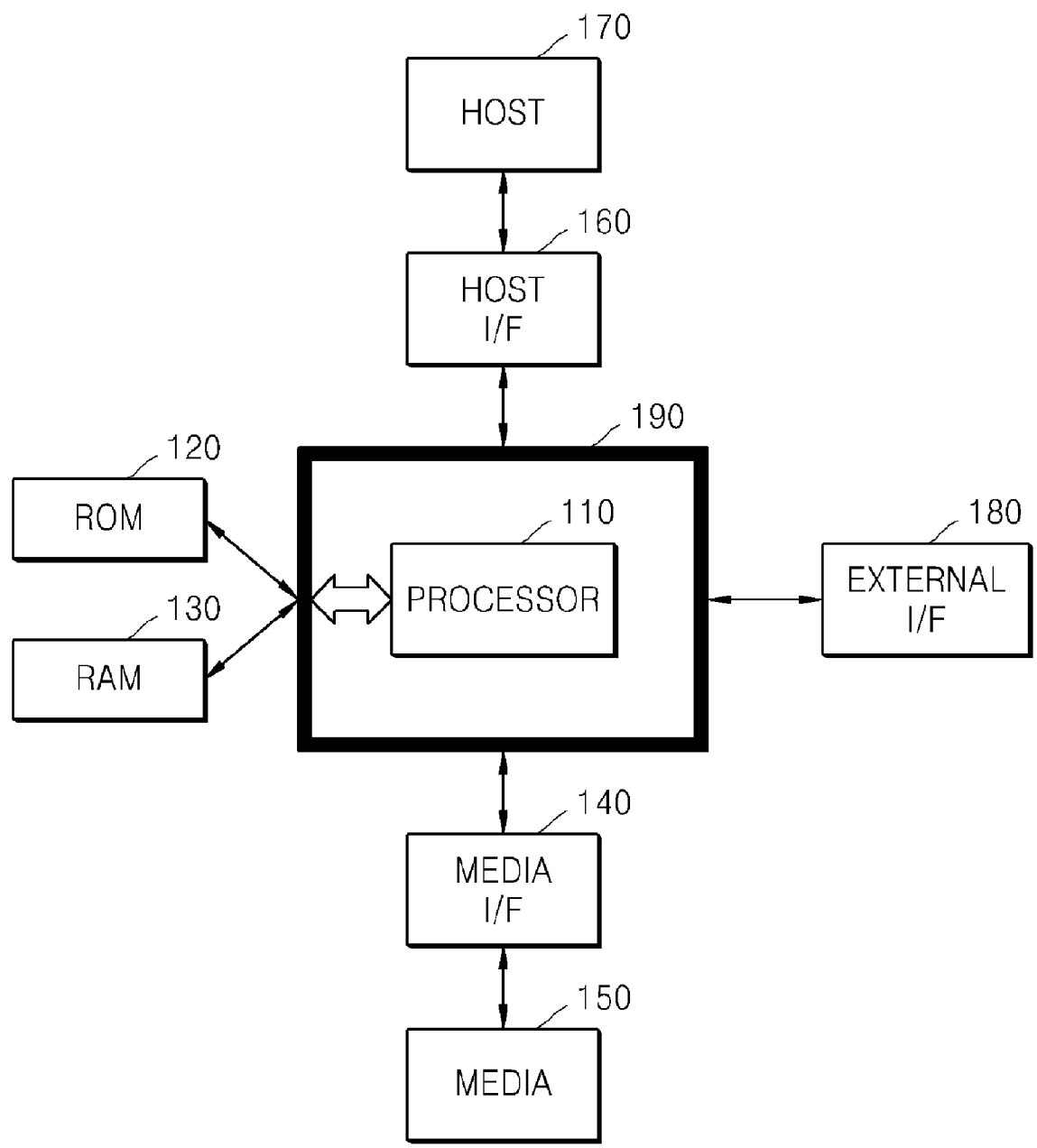
FIG. 1 is a block diagram of a data storage device according to an embodiment of the inventive concept.

FIG. 1 is a block diagram illustrating a data storage device according to an embodiment of the inventive concept. Referring to FIG. 1, the data storage device comprises a processor 110, a read only memory (ROM) 120, a random access memory (RAM) 130, a media interface (I/F) 140, a media 150, a host I/F 160, a host device 170, an external I/F 180, and a bus 190.

Processor 110 interprets commands and controls elements of the data storage device according to the commands. Processor 110 comprises a code object management unit (not shown), and loads a code object stored in media 150 into RAM 130 using the code object management unit. In particular, processor 110 loads into RAM 130 code objects for executing methods of processing defects in a recording medium, such as those illustrated in FIGS. 6 through 9, if a command to detect a defect of media 150 is issued in a test process or a user environment.

After loading these code objects into RAM 130, processor 110 executes a task to detect and compensate for a defect of media 150, as illustrated in FIGS. 6 through 9, by using the code objects loaded in RAM 130, and stores information required for processing defects in media 150 or ROM 120. Examples of the information required for processing defects include a first threshold value that is used to detect a hard defect sector, a second threshold value that is used to detect a TNU sector, a defect list used to prevent access to sectors determined as defect sectors, and a reallocation sector list.

The methods of detecting and compensating for defects of a recording medium by processor 110 will be described in further detail with reference to FIGS. 6 through 9.

ROM 120 stores program codes and data required for operating the data storage device.

The program codes and data stored in ROM 120 or media 150 are loaded into RAM 130 according to control by processor 110.

Media 150 typically comprises a disk as a main storage medium of the data storage device. The data storage device can comprise, for instance, a disk drive. An example of a head disk assembly comprising a disk in a disk drive is illustrated in FIG. 2.

Figure 2:
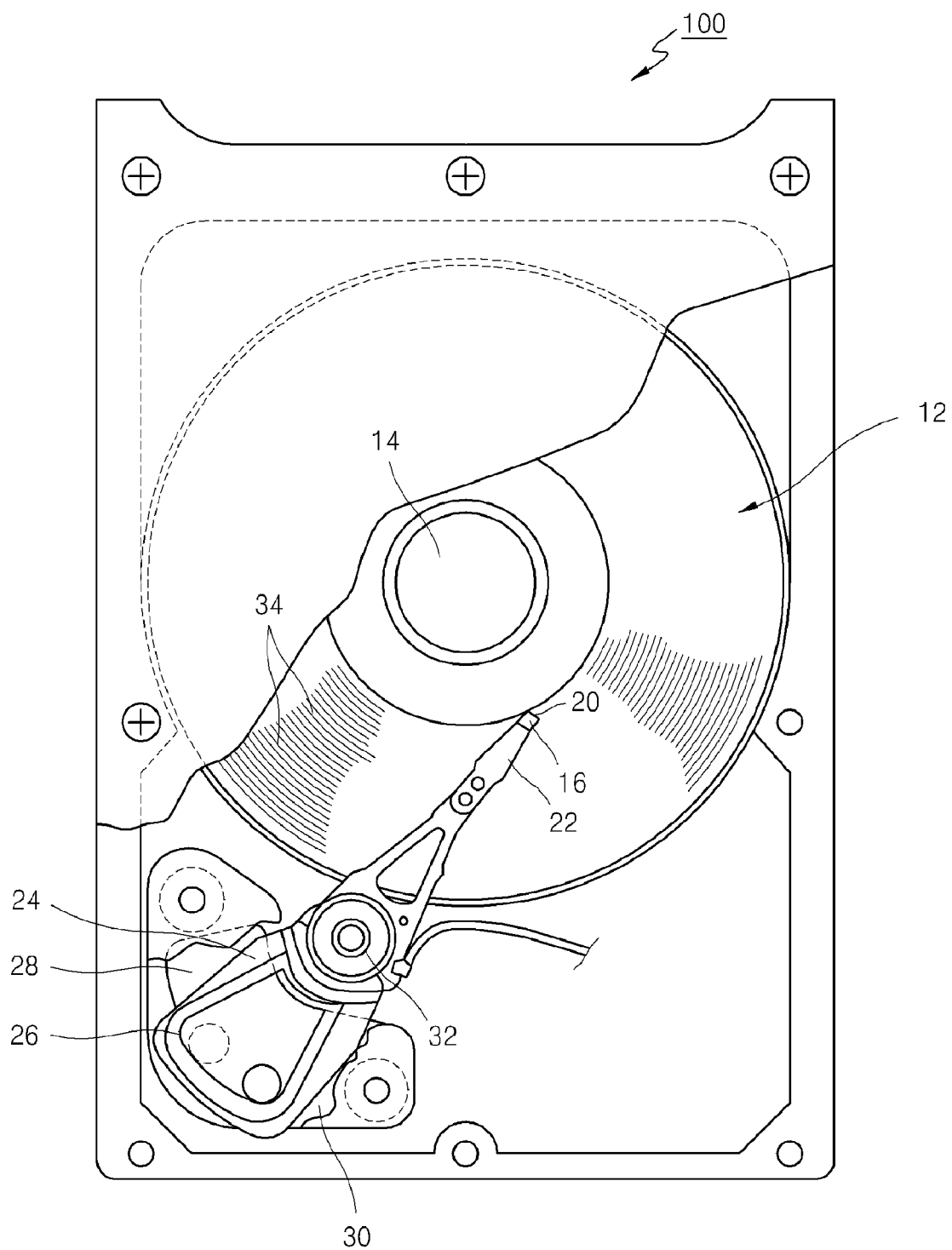
FIG. 2 is a plan view of a head disk assembly of a disk drive according to an embodiment of the inventive concept.

FIG. 2 is a plan view illustrating a head disk assembly 100 of a disk drive according to an embodiment of the inventive concept. Referring to FIG. 2, head disk assembly 100 comprises at least one magnetic disk 12 that is rotated by a spindle motor 14. The disk drive further comprises a transducer 16 located adjacent to a surface of disk 12.

Transducer 16 senses a magnetic field of disk 12 or magnetizes disk 12 to read or write information in disk 12 as it rotates. In general, transducer 16 is associated with a surface of disk 12. Although one transducer 16 is illustrated in FIG. 2, transducer 16 typically comprises a writing transducer for magnetizing disk 12 and a reading transducer for sending the magnetic field of disk 12. The reading transducer can comprise, for instance, a magneto-resistive (MR) device. Transducer 16 can also be referred to as a magnetic head or a head.

Transducer 16 is integrated with a slider 20, which generates an air bearing between surfaces of transducer 16 and disk 12. Slider 20 is integrated with a head gimbal assembly 22, and head gimbal assembly 22 is attached to an actuator arm 24 having a voice coil 26. Voice coil 26 is disposed adjacent to a magnetic assembly 28 to define a voice coil motor (VCM) 30. A current supplied to voice coil 26 generates torque for rotating actuator arm 24 with respect to bearing assembly 32. Due to the rotation of actuator arm 24, transducer 16 is moved across the surface of disk 12.

Data is stored in annular tracks 34 of disk 12. Each of tracks 34 comprises a plurality of sectors. Each of the sectors comprises a data field and an identification field. The identification field comprises a gray code for identifying a track or cylinder. A logic block address is allocated in a writable area of disk 12. The logic block address of the disk drive is converted to cylinder/head/sector information to designate the writable area of disk 12. Defect sectors in the defect list should not be allocated with logic block addresses so as to make them inaccessible. Disk 12 is divided into a maintenance cylinder area that is not accessible by a user and a data area that is accessible by the user. The maintenance cylinder area is also referred to as a system area. The defect list and reallocation sector lists are stored in the maintenance cylinder area.

Transducer 16 is moved across the surface of disk 12 to read data from or write data to other tracks. A plurality of code objects for enabling the disk drive to implement various functions may be stored in disk 12. For example, a code object for executing a MP3 player function, a code object for executing a navigation function, or a code object for executing various video games may be stored in disk 12.

Referring again to FIG. 1, media I/F 140 allows processor 110 to access media 150 to write or read data. Media I/F 140, which may take the form of a disk drive, comprises a servo circuit for controlling head disk assembly 100 and a read/write channel circuit for processing a signal to read or write data.

Host I/F 160 performs data transmission and reception to and from host device 170. Host I/F 160 can comprise an interface, such as a serial advanced technology attachment (SATA) interface, a parallel advanced technology attachment (PATA) interface, or a universal serial bus (USB) interface.

External I/F 180 performs data transmission or reception to or from an external device via an input/output terminal installed in the data storage device. External I/F 180 can comprise an interface, such as an accelerated graphics port (AGP) interface, a USB interface, an IEEE1394 interface, a personal computer memory card international association (PCMCIA) interface, a local area network (LAN) interface, a Bluetooth interface, a high-definition multimedia interface (HDMI), a programmable communication interface (PCI), an industry standard architecture (ISA) interface, a peripheral component interconnect-express (PCI-E) interface, an Express Card interface, a SATA interface, a PATA interface, or a serial interface.

Bus 190 transfers data among the elements of the data storage device.

Figure 3:
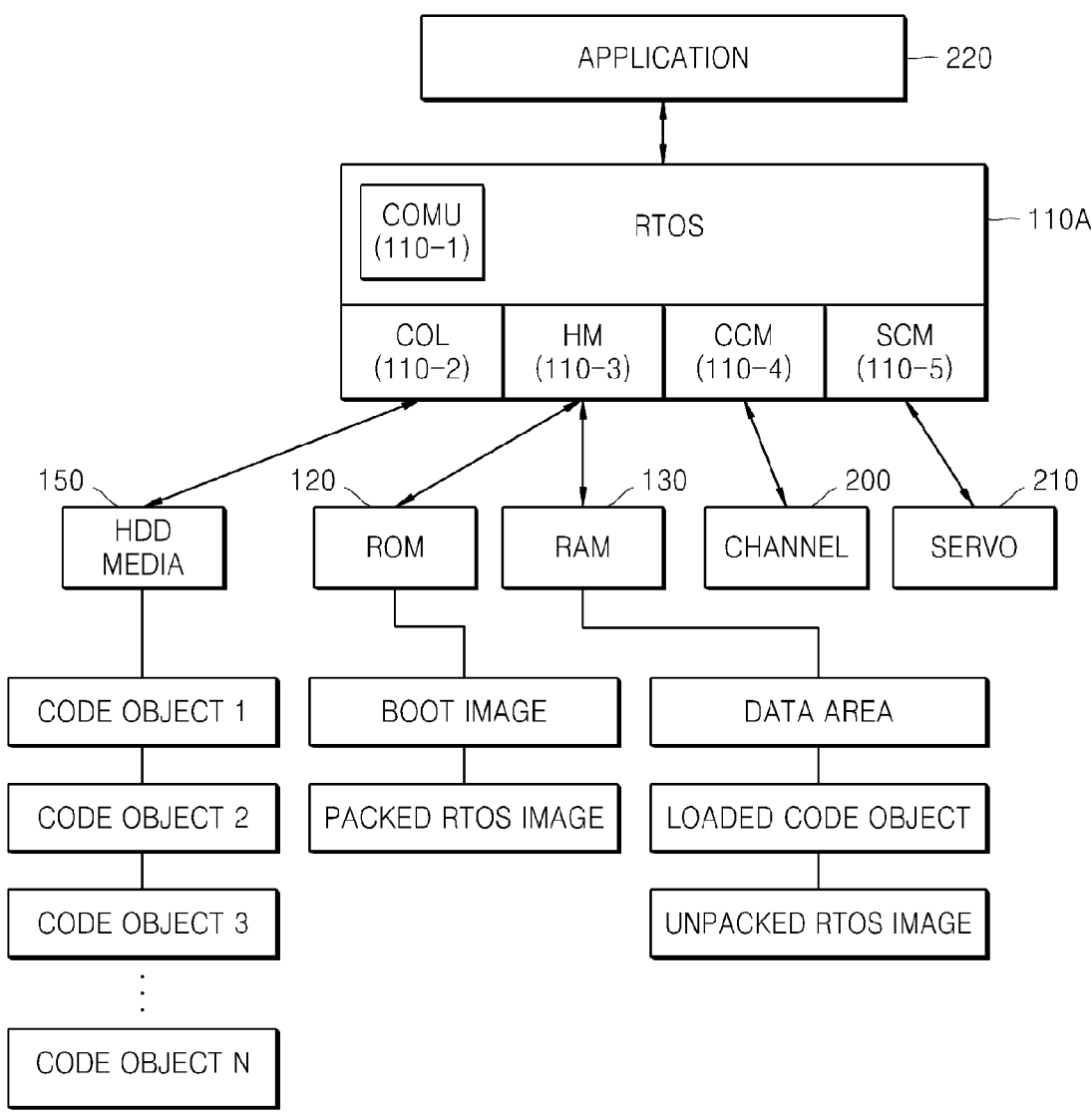
FIG. 3 is a block diagram of a software management system of the data storage device of FIG. 1.

FIG. 3 illustrates a software management system for the data storage device of FIG. 1. For explanation purposes, it will be assumed that the data storage device is a hard disk drive (HDD), and media 150 is a disk.

Referring to FIG. 3, media 150 stores a plurality of code objects 1 to N, and ROM 120 stores a boot image and a packed real-time operating system (RTOS) image.

The code objects stored in media 150 comprise code objects for operating the HDD and code objects for performing various extendible functions of the HDD. In particular, media 150 stores code objects for executing the methods of FIGS. 6 through 9. Alternatively, the code objects for executing the methods of FIGS. 6 through 9 could also be stored in ROM 120, instead of media 150. Media 150 can also store code objects for executing various functions such as a MP3 player function, a navigation function, and a video game function.

An unpacked RTOS image obtained by reading a boot image from ROM 120 is loaded to RAM 130. Thereafter, code objects for executing host I/F 160 and external I/F 180 are loaded from media 150 into RAM 130.

Circuits for processing a signal to read or write data are installed in a channel circuit 200, and circuits required for controlling head disk assembly 100 to read or write data are installed in servo circuit 210.

An RTOS 110A is a multiple program operating system using a disk. Depending on tasks, real-time multi-processing is performed on a higher priority foreground task, and batch-processing is performed on a lower priority background task. In addition, RTOS 110A loads code objects to the media 150 disk and unloads code objects from media 150.

RTOS 110A manages a code object management unit (COMU) 110-1, a code object loader (COL) 110-2, a memory handler (MH) 110-3, a channel control module (CCM) 110-4, and a servo control module (SCM) 110-5 to execute tasks according to requested commands. RTOS 110A also manages application programs 220.

RTOS 110A loads code objects required for controlling the HDD to RAM 130 when the HDD is booted. Then, after booting, the HDD is operated using the code objects loaded to RAM 130.

COMU 110-1 stores position information about where code objects are written, converts virtual addresses into actual addresses, and performs a bus arbitration process. COMU 110-1 also stores information about priorities of tasks being executed. COMU 110-1 also manages task control block (TCB) information and stack information required for executing tasks regarding code objects.

COL 110-2 loads the code objects stored in media 150 into RAM 130 using COMU 110-1 or unloads the code objects stored in RAM 130 to media 150 of the HDD. In particular, COL 110-2 loads code objects for executing the methods of FIGS. 6 through 9 from media 150 to RAM 130. Accordingly, RTOS 110A executes the methods of FIGS. 6 through 9 using the code objects loaded to RAM 130.

MH 110-3 writes data to or reads data from ROM 120 or RAM 130.

CCM 110-4 performs channel controlling required for processing a signal to write or read data. SCM 110-5 controls a servo system, comprising head disk assembly 100 for reading/writing data.

Figure 4:
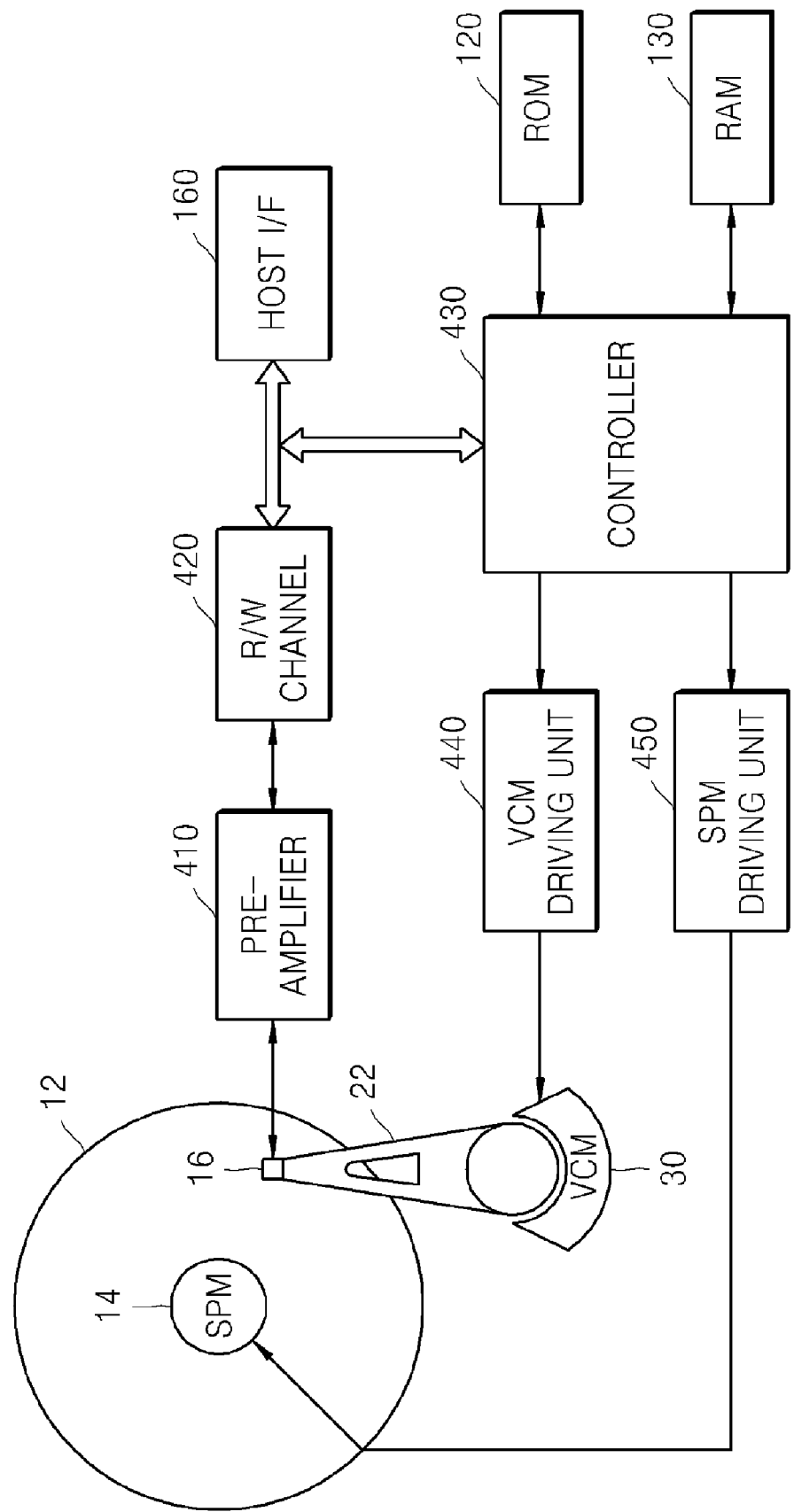
FIG. 4 is a block diagram of an electrical system of a disk drive according to another embodiment of the inventive concept.

FIG. 4 is a block diagram illustrating an electric system of a disk drive, which is an example of the data storage device of FIG. 1.

In the example of FIG. 4, the disk drive comprises a pre-amplifier 410, a read/write (R/W) channel 420, a controller 430, a VCM driving unit 440, a spindle motor (SPM) driving unit 450, a ROM 120, a RAM 130, and a host interface 160.

Controller 430 can comprise, for instance, a digital signal processor (DSP), a microprocessor, a microcontroller, or a processor. Controller 430 controls R/W channel 420 to read data from disk 12 or to write data to disk 12 according to a command received from host device 170 via host interface 160.

Controller 430 is coupled to VCM driving unit 440, which supplies a driving current to drive a VCM 30. Controller 430 supplies a control signal to VCM driving unit 440 to control movement of transducer 16.

Controller 430 is coupled to SPM driving unit 450, which supplies a driving current for driving SPM 14. When power is supplied, controller 430 supplies a control signal to SPM driving unit 450 to rotate SPM 14 at a target speed.

Controller 430 is coupled to ROM 120 and RAM 130. ROM 120 stores firmware and control data for controlling the disk drive. ROM 120 also stores program codes and data for executing the methods of FIGS. 6 through 9. However, these program codes and data could alternatively be stored in a maintenance cylinder area of disk 12, instead of in ROM 120.

In a data read operation, pre-amplifier 410 amplifies an electric signal sensed from disk 12 by transducer 16. R/W channel 420 amplifies the electrical signal output from pre-amplifier 410 by using an automatic gain control circuit (not shown) that automatically varies a gain according to an amplitude of the electrical signal, converts the electrical signal into a digital signal, and then decodes the digital signal to detect data. For example, an error correction process may be performed on the detected data by controller 430 using a Reed-Solomon code, and then the detected data can be converted into stream data and transmitted to host device 170 via host I/F 160. Controller 430 executes an operation for detecting a defect in an ECC scan operation to obtain information about the number of error-corrected ECC symbols for each sector among ECC symbols included in the information read from the disk.

In a write operation, the disk drive receives data from host device 170 via host I/F 160, and controller 430 adds an error correction symbol using a Reed-Solomon code, and R/W channel 420 encodes the data to be suitable for a write channel. Then, the data is written to disk 12 by transducer 16 to which a write current amplified by pre-amplifier 410 is applied.

To process defects in media 150, controller 430 loads program codes and data for executing the methods of FIGS. 6 through 9 from ROM 120 or disk 12 into RAM 130. Controller 430 then controls the elements of the disk drive to execute the methods using the program codes and data loaded into RAM 130.

Figure 5:
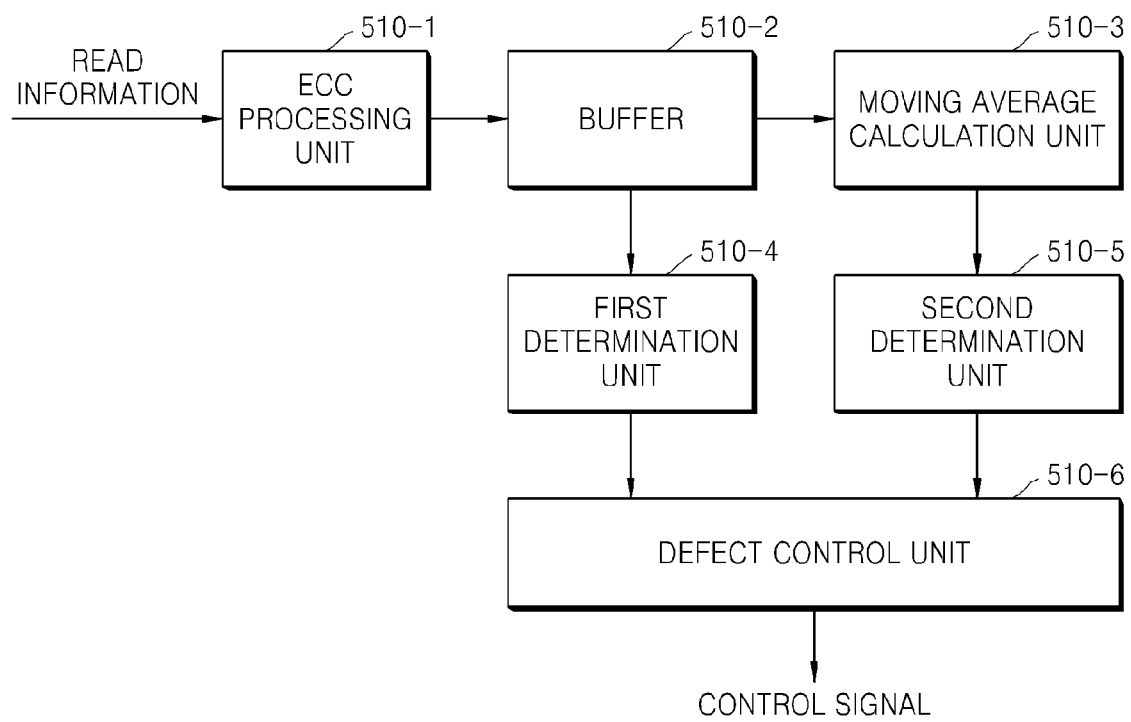
FIG. 5 is a block diagram of an apparatus for processing defects of a recording medium according to an embodiment of the inventive concept.

FIG. 5 is a block diagram of an apparatus for processing defects of a recording medium according to an embodiment of the inventive concept. The apparatus of FIG. 5 can be designed to incorporate processor 110 of the data storage device of FIG. 1 or controller 430 of FIG. 4, or may be designed as a separate circuit.

In the embodiment of FIG. 5, the apparatus for processing defects of a recording medium in FIG. 2 is designed to include processor 110 or controller 430.

Referring to FIG. 5, the apparatus for processing defects of a recording medium comprises an ECC processing unit 510-1, a buffer 510-2, a moving average calculation unit 510-3, a first determination unit 510-4, a second determination unit 510-5, and a defect control unit 510-6.

Figure 10:
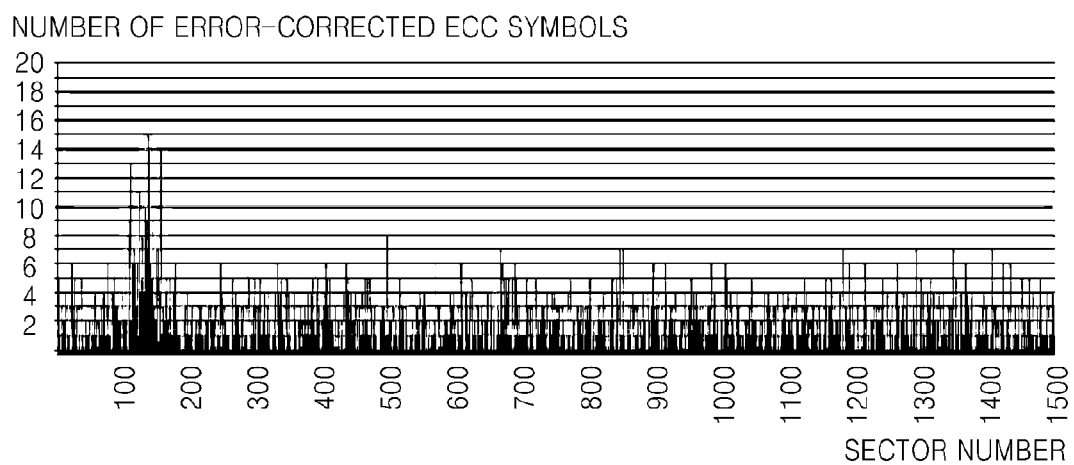
FIG. 10 illustrates a distribution of a number of error-corrected ECC symbols of each sector calculated using a method of processing a defect of a recording medium according to an embodiment of the inventive concept.

ECC processing unit 510-1 detects error-corrected ECC symbols among ECC symbols included in the information read from each track. The error-corrected ECC symbols are detected by an ECC scanning operation to obtain information about the number of error-corrected ECC symbols of each sector. For example, ECC processing unit 510-1 can detect error-corrected ECC symbols among ECC symbols by using a Reed-Solomon (RS) decoder and generate an ECC correction symbol for correcting the erroneous ECC symbol. Then, the number of error-corrected ECC symbols in each sector can be counted to obtain information about the number of error-corrected ECC symbols in each sector. FIG. 10 illustrates an example distribution of the calculated number of error-corrected ECC symbols for each sector.

ECC processing unit 510-1 stores information about the number of error-corrected ECC symbols of each of the sectors of one track in buffer 510-2. Buffer 510-2 stores the information about the number of error-corrected ECC symbols of each of the sectors and corresponding sector information.

First determination unit 510-4 compares the information about the number of error-corrected ECC symbols of each sector with a first threshold value, determines a sector whose number of error-corrected ECC symbols is greater than the first threshold value as a hard defect sector, and generates hard defect sector determination information. The first threshold value is set to be equal to or less than a maximum number of ECC symbols that is required to normally perform error correction in one sector. For example, the first threshold value may be set to be equal to or less than 80% of a maximum number of ECC symbols that is required to normally perform error correction in one sector.

Figure 11:
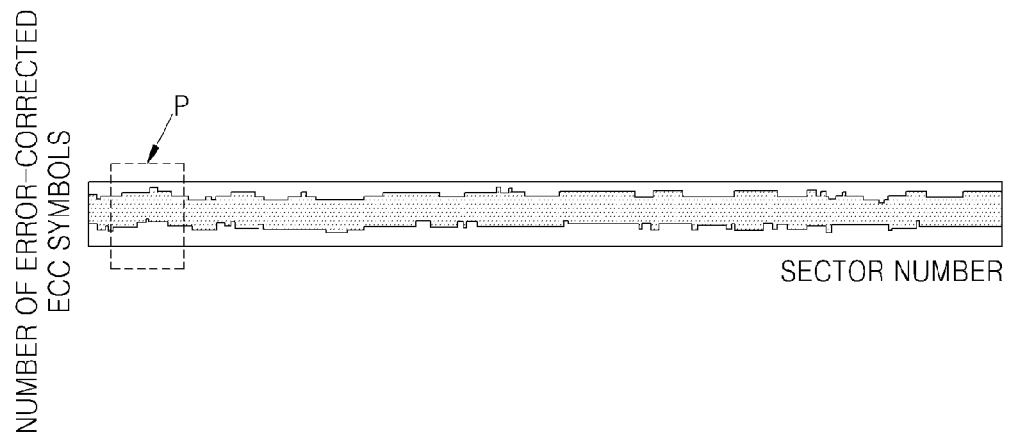
FIG. 11 illustrates a distribution of moving averages of the numbers of error-corrected ECC symbols calculated using a method of processing a defect of a recording medium according to an embodiment of the inventive concept.
Figure 12:
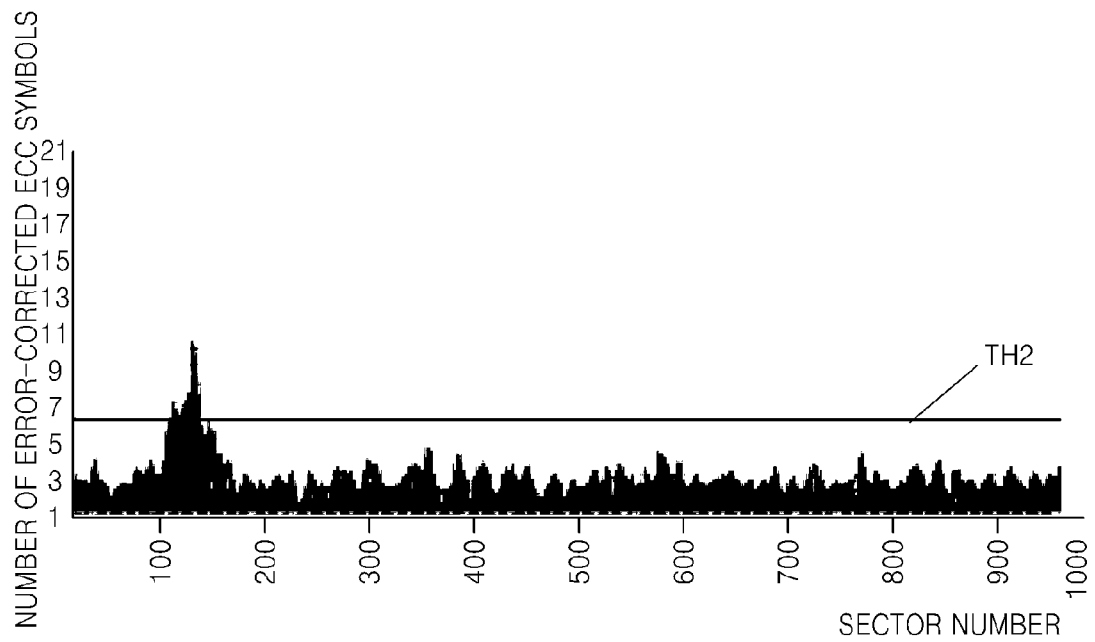
FIG. 12 illustrates a distribution of moving averages of the numbers of error-corrected ECC symbols calculated using a method of processing a defect of a recording medium according to another embodiment of the inventive concept.

Moving average calculation unit 510-3 calculates an average of the numbers of error-corrected ECC symbols in units of a predetermined number of sectors as a moving average and thus obtains the calculated moving averages. Herein, a window size for calculating the moving averages is determined according to the predetermined number of sectors. For example, the window size may be 10 sectors. The window size can be varied. FIGS. 11 and 12 illustrate example distributions of the numbers of error-corrected ECC symbols after the moving average calculation is performed.

Second determination unit 510-5 compares the result of the moving average calculation performed on the information about the number of error-corrected ECC symbols with a second threshold value. It then determines sectors that are included in the window used to calculate a moving average that is greater than the second threshold value as TNU sectors and generates TNU sector determination information. Herein, the second threshold value may be set to be smaller than the first threshold value. For example, the second threshold value may be set by an experiment under various TNU conditions to a value that is detectable under various TNU conditions. If the second threshold value is set to be relatively high, only sectors having a serious TNU may be detected. On the contrary, if the second threshold value is set to be relatively low, sectors having a minor TNU may also be detected. In FIG. 11, AC TNU sectors are seen in a region "P."

FIG. 12 illustrates that the AC TNU sectors in the P region of FIG. 11 can be detected using a second threshold value TH2.

Defect control unit 510-6 controls the elements of the data storage device or the disk drive to add sectors that are determined as hard defect sectors or TNU sectors based on the hard defect sector determination information or the TNU determination information, to the defect list and to perform a screen process thereon to make them inaccessible. Defect control unit 510-6 controls the elements of the data storage device or the disk drive to reallocate the hard defect sectors to a spare sector of the recording medium and to correct the off-track amounts of the TNU sectors in the corresponding sector and execute a rewriting process therein.

In a test process, defect control unit 510-6 adds the hard defect sectors or the TNU sectors to the defect list and performs a screen process thereon to make them inaccessible. In other words, defect sectors in the defect list are not allocated with logic block addresses; rather, they are screen-processed to be skipped and be inaccessible.

Where the final product is used in a user environment, defect control unit 510-6 adds hard defect sectors to a reallocation sector list to be reallocated to the spare sector of the recording medium, measures and corrects the off-track amounts of the TNU sectors, and executes a rewriting process therein after performing the off-track correction of the TNU sectors. For example, a method of measuring an off-track amount may involve calculating an error rate in data that is read by applying a +/− off-track correction and determining an off-track amount at which the error rate is a minimum as an off-track amount of a region including the TNU sectors.

Defect control unit 510-6 stores the defect list information or the reallocation sector list information generated as described above in disk 12 or the ROM used as a recording medium.

FIGS. 6 through 9 illustrate methods of processing defects in a recording medium according to selected embodiments of the inventive concept. The defects are processed under the control of processor 110 of the data storage device of FIG. 1 or controller 430 of the disk drive of FIG. 4.

Figure 6:
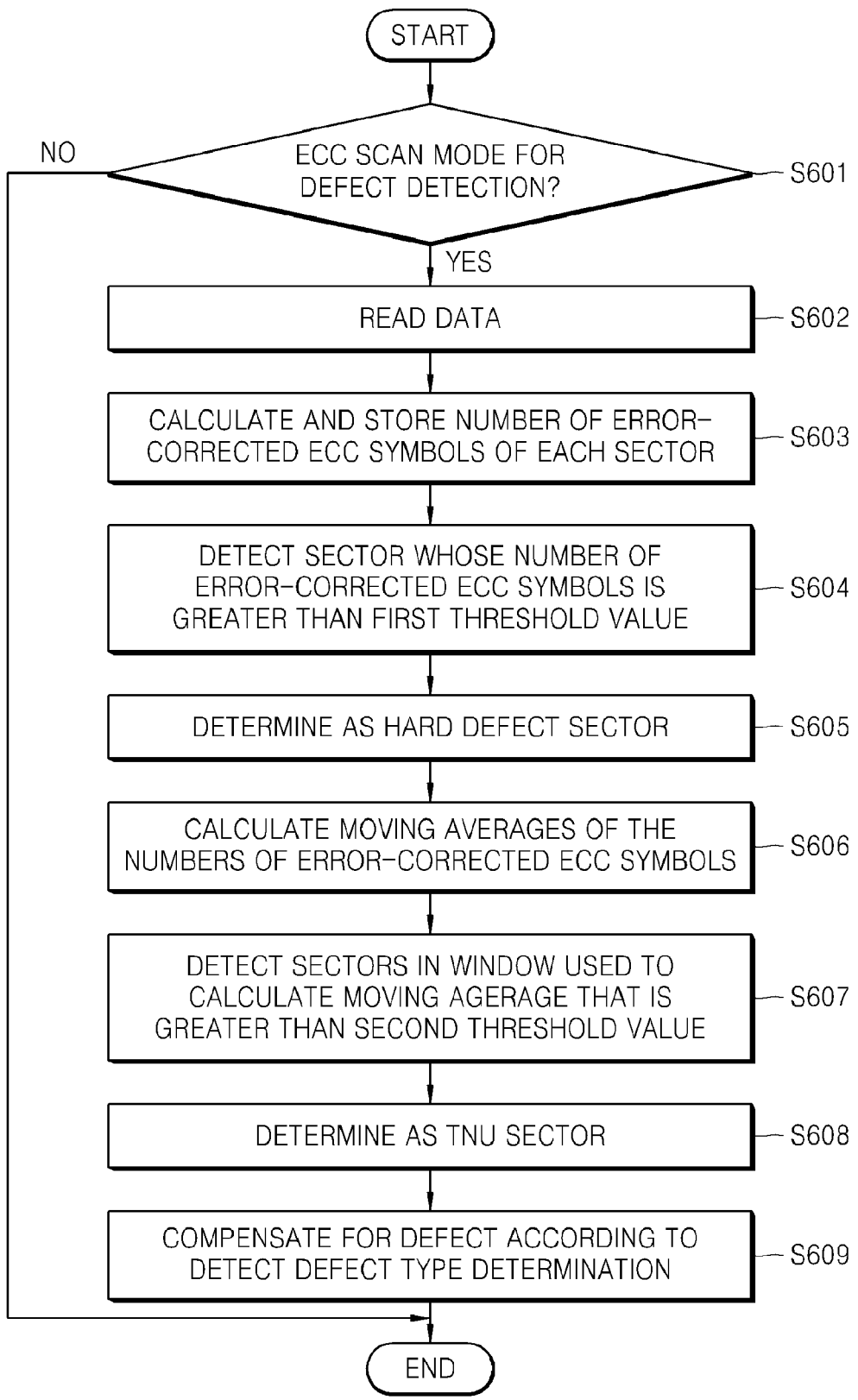
FIG. 6 is a flowchart of a method of processing defects of a recording medium according to an embodiment of the inventive concept.

Referring to FIG. 6, a method of processing a defect begins by determining whether processor 110 or controller 430 generates a control signal for executing an ECC scan operation to detect a defect of the recording medium (S601). The control signal for executing the ECC scan operation can be generated in response to a command transmitted from the host device. Alternatively, the data storage device can be designed in such a manner that processor 110 or controller 430 spontaneously generates a control signal for executing the ECC scan operation if the data storage device satisfies a specific condition.

Where it is determined that the control signal for executing the ECC scan operation is generated (S601=Yes), information recorded in disk 12 is read in units of tracks and simultaneously from entire sectors of each track (S602). Otherwise (S601=No), the method ends.

The number of error-corrected ECC symbols among the ECC symbols included in the data read in operation S602 is detected in units of sectors and stored in buffer 510-2 (S603). In other words, sector information and information about the number of error-corrected ECC symbols of the corresponding sector are stored in buffer 510-2.

The information about the number of error-corrected ECC symbols of each sector is read from buffer 510-2 to detect any sector whose number of error-corrected ECC symbols is greater than a first threshold value (S604). A method of setting the first threshold value is described above and will not be repeated in order to avoid redundancy.

A sector having a number of error-corrected ECC symbols greater than the first threshold value, as detected in operation S604, is identified as a hard defect sector, which is defined as a first type defect sector (S605).

Next, the information regarding the number of error-corrected ECC symbols of each of the sectors is read from buffer 510-2 to calculate moving averages using a predetermined window size (S606).

Each of the moving averages calculated in operation S606 is compared with a second threshold value to detect sectors in the window that are used to calculate a moving average that is greater than the second threshold value (S607).

The sectors detected in operation S607 are determined as TNU sectors, which are defined as second type defect sectors (S608). In other words, the sectors in the window that are used to calculate a moving average greater than the second threshold value are determined as TNU sectors.

Next, different defect compensation processes are executed on the sectors according to whether they are determined as hard defect sectors or TNU sectors (S609). Different defect compensation processes can be effectively applied in a test process and in a user environment, as will be described in detail with reference to FIGS. 8 and 9.

Figure 8:
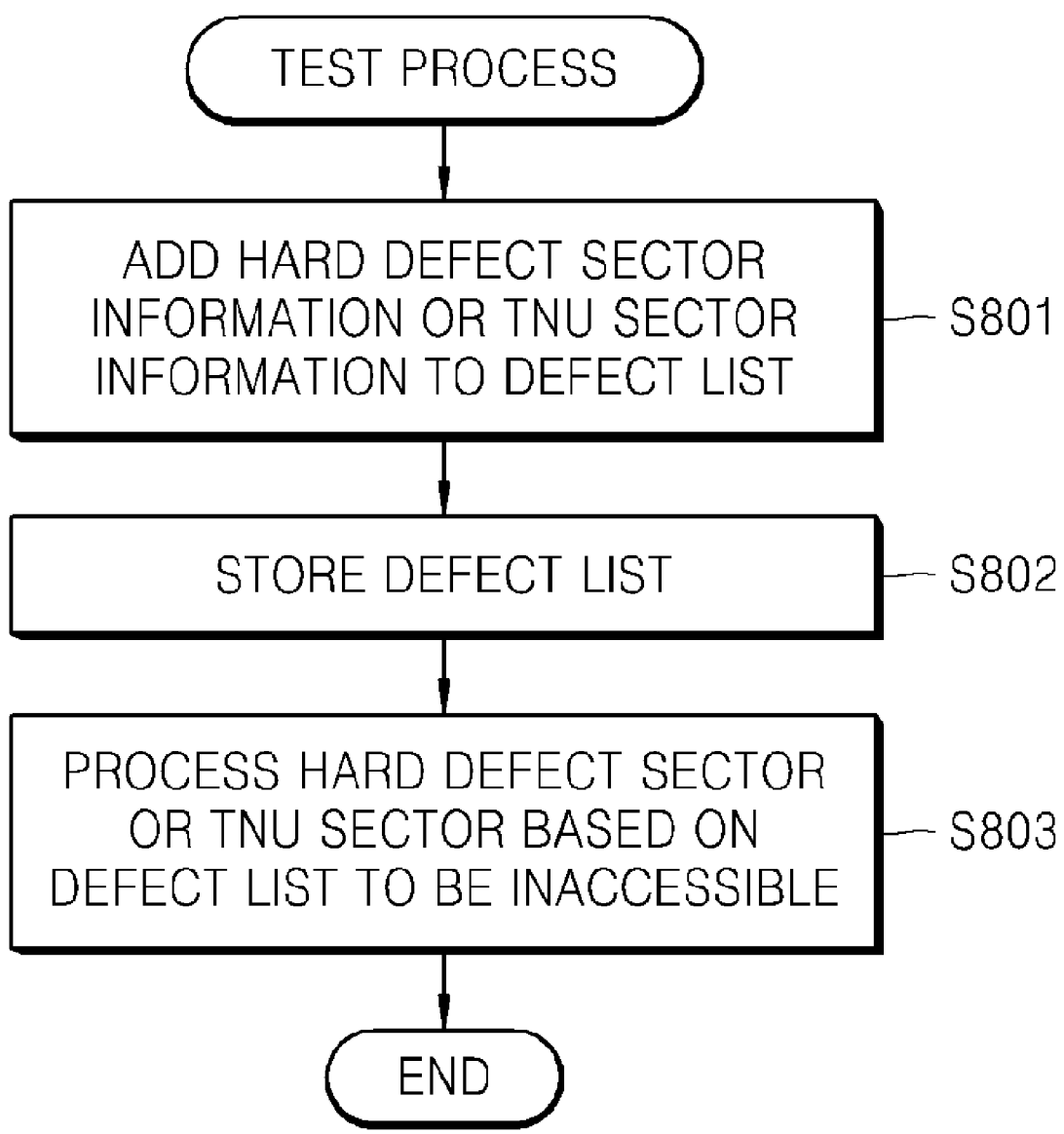
FIG. 8 is a flowchart of a defect compensation method in a test process according to an embodiment of the inventive concept.

FIG. 8 illustrates a defect compensation method for a test process involved in the manufacture of a data storage device.

In the test process, information about the sectors determined as hard defect sectors or TNU sectors is added to the defect list loaded in RAM 130 (S801). The defect list also comprises information about inaccessible sectors of the recording medium, for example, disk 12.

After the defect test is completed on all tracks of the recording medium, the defect list is stored in disk 12 or ROM 120 (S802). After the defect list is stored in disk 12, the defect list can be stored in the maintenance cylinder region, which is inaccessible to the user.

Sectors in the defect list stored in disk 12 or ROM 120 are processed to make them inaccessible to a user, e.g., by not associating the sectors with a logic block address (S803).

Figure 9:
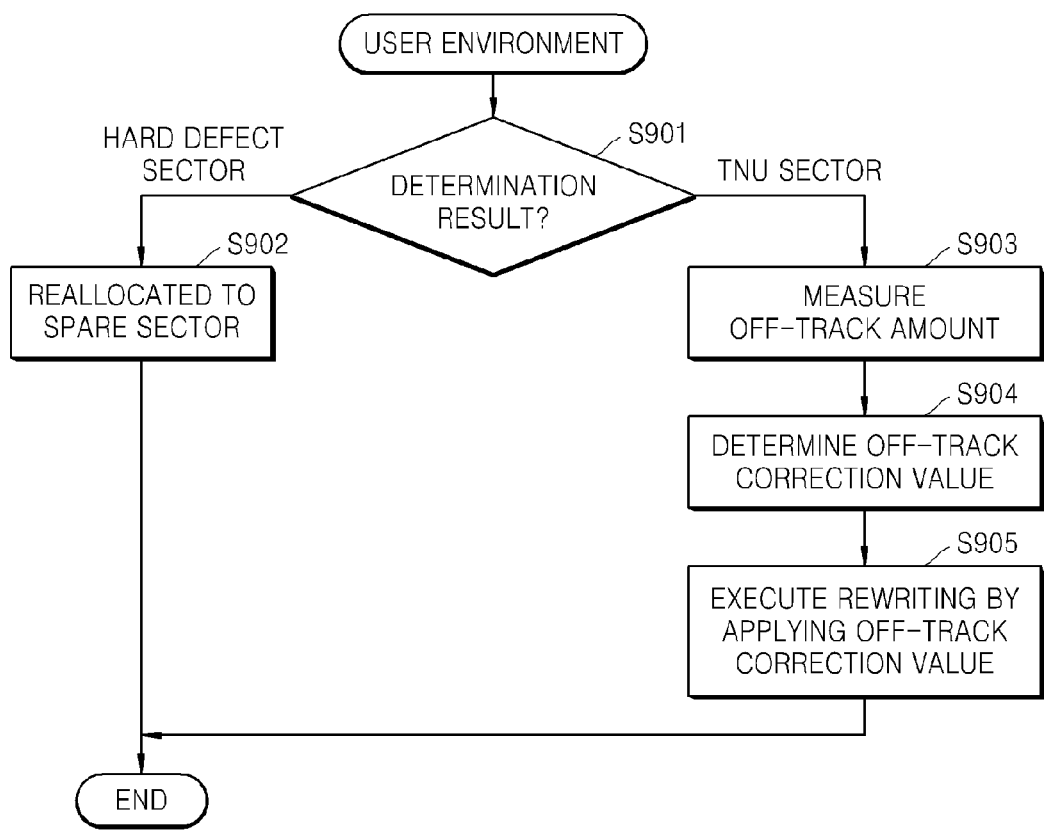
FIG. 9 is a flowchart of a defect compensation method in a user environment according to an embodiment of the inventive concept.

FIG. 9 illustrates a defect compensation method for a data storage device in a user environment.

In the user environment, after detection of a defect sector of the recording medium, the method determines whether the detected defect sector is a hard defect sector or a TNU sector (S901).

Where operation S901 determines the defect sector to be a hard defect sector, the hard defect sector is reallocated to a spare sector of the recording medium (S902). In other words, the defect sector is added to a reallocation sector list for reallocating hard defect sectors to a spare sector of the recording medium. Sector information of the hard defect sector and the spare sector information for reallocation of the hard defect sector are stored in the reallocation sector list to correspond to each other. Accordingly, where a command to access a hard defect sector in the reallocation list is received, the command is executed to access a corresponding spare sector for reallocating the hard defect sector.

Where operation S901 determines the defect sector to be a TNU sector, an off-track amount in a region including the TNU sector is measured (S903). The measurement of the off-track amount may involve, for instance, calculating error occurrence rates in data that is read by applying a +/− off-track correction, and determining an off-track amount at which the error occurrence rate is the least as an off-track amount of the region including the TNU sectors.

Next, an off-track correction value is determined for compensating for the off-track amount measured in the region including the TNU sectors to place the sectors on track (S904).

Next, a rewriting process is executed on the sectors determined as TNU sectors by applying the off-track correction value determined in operation S904 (S905). In other words, information is read from the sectors determined as TNU sectors by applying the off-track correction value, and the information is then rewritten to the same sectors.

Figure 7:
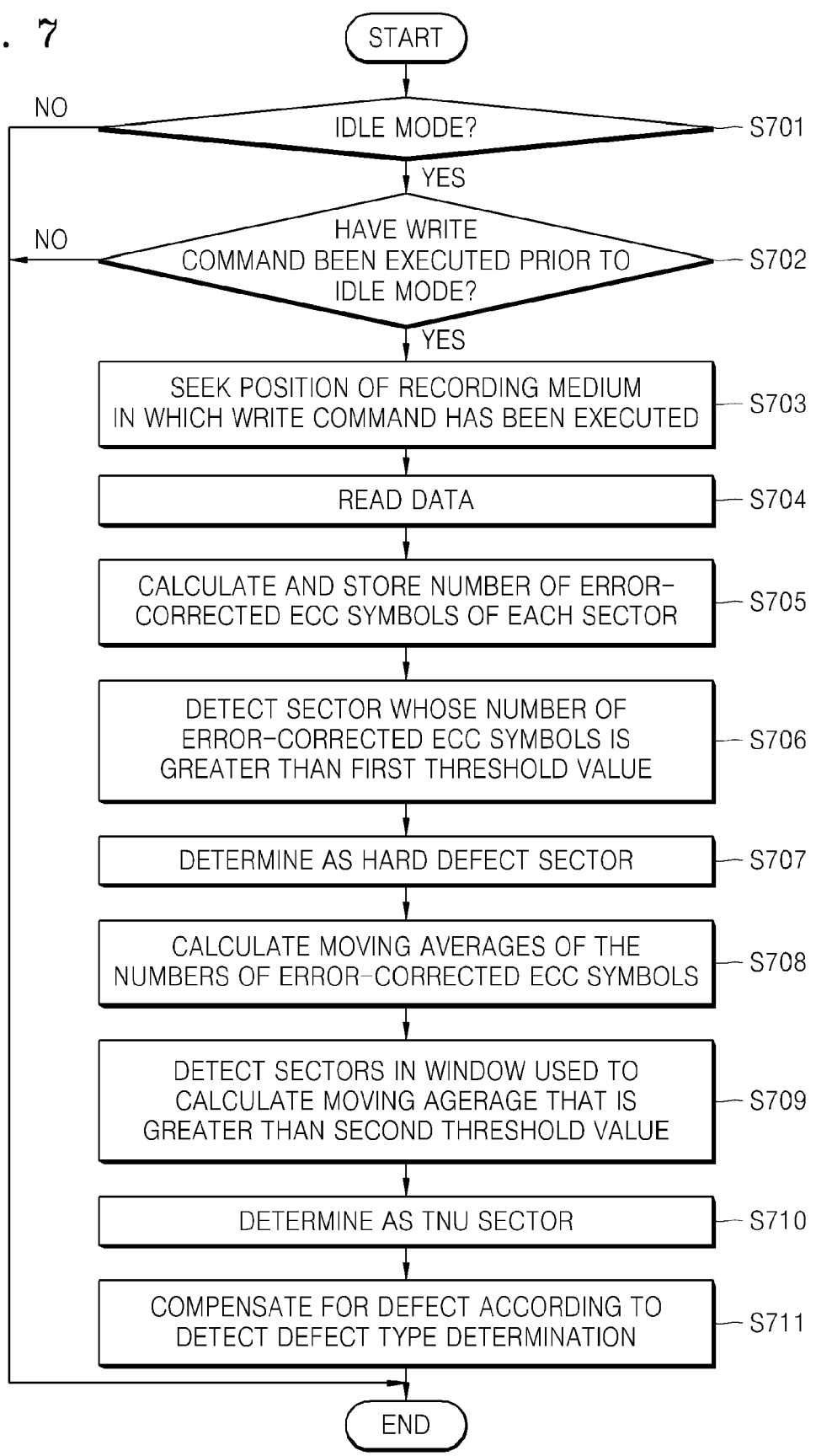
FIG. 7 is a flowchart of a method of processing defects of a recording medium according to another embodiment of the inventive concept.

FIG. 7 illustrates a method of processing a defect of a recording medium according to another embodiment of the inventive concept.

In the method of FIG. 7, processor 110 or controller 430 determines whether the data storage device or the disk drive is in transition to an idle mode (S701).

Where the method determines that the data storage device or the disk drive is in transition to the idle mode (S701=Yes), the method then determines whether a write command has been executed prior to the transition to the idle mode (S702). If information about commands that have been previously executed is stored in RAM 130 or buffer 510-2, the method identifies whether a write command has been previously performed and a position of the recording medium in which the write command has been executed.

Where it is determined that a write command has been executed prior to the transition to the idle mode (S702=Yes), a position of the recording medium in which the write command has been previously executed is sought out (S703). Thereafter, data is read from the position of the recording medium sought out in operation S703 (S704). Herein, information written in the recording medium is read during an ECC scan operation. In the ECC scan operation, the information is read in units of tracks.

The number of error-corrected ECC symbols, among ECC symbols in the information read in operation S704, is detected in each sector and stored in buffer 510-2 (S705). In other words, sector information and information about the number of error-corrected ECC symbols in the corresponding sector are stored in buffer 510-2.

The information about the number of error-corrected ECC symbols in each of the sectors is read from buffer 510-2 to detect any sector whose number of error-corrected ECC symbols is greater than a first threshold value (S706).

A sector having a number of error-corrected ECC symbols greater than the first threshold value is determined to be hard defect sector (S707).

Next, the information regarding the number of error-corrected ECC symbols in each of the sectors is read from buffer 510-2 to calculate moving averages using a predetermined window size (S708).

Each of the moving averages calculated in operation S708 is compared with a second threshold value to detect sectors in the window that are used to calculate a moving average that is greater than the second threshold value (S709).

The sectors detected in operation S709 are determined as TNU sectors (S710). In other words, the sectors in the window that are used to calculate a moving average greater than the second threshold value are determined as TNU sectors.

Next, different defect compensation processes are executed on the hard defect sectors or TNU sectors according to the result of determining the type of defect sectors (S711). The defect compensation processes can be performed according to the method of FIG. 9 described above.

In a test process or user environment, through the operations described above, defects of a recording medium can be detected and compensated for in different ways according to their type. Hard defect sectors and TNU sectors can be detected using an ECC scan operation based on different classification criteria. In a test process that is part a of the manufacturing processes of recording media, defect sectors such as hard defect sectors and TNU sectors are screen-processed to be inaccessible. In the user environment, hard defect sectors can be processed to be automatically reallocated to a spare sector. Meanwhile, TNU sectors can be compensated for by an off-track amount, and then a rewriting process can be performed thereon.

As indicated by the foregoing, the inventive concept can be embodied in a variety of forms, such as a method, a device, or a system. In addition, the inventive concept can also be embodied by code segments for implementing a method or operating a device or system. Such code segments can be stored in a computer readable medium.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of processing a defect of a recording medium, the method comprising:
    detecting a number of error-corrected error correction code (ECC) symbols in each of a plurality of sectors of the recording medium;
    classifying a sector having a number of error-corrected ECC symbols greater than a first threshold value as a first type defect sector;
    calculating moving averages of the numbers of error-corrected ECC symbols in sector units comprising a predetermined number of sectors; and
    classifying sectors that belong to sector units having a moving average greater than a second threshold value as second type defect sectors.

2. The method of claim 1, wherein detecting of the number of error-corrected ECC symbols in each sector comprises reading information recorded in the recording medium in units of tracks and simultaneously from entire sectors of each track.

3. The method of claim 1, wherein the first threshold value is greater than the second threshold value.

4. The method of claim 1, further comprising screen-processing the sectors that are classified as either first type defect sectors or second type defect sectors to make them inaccessible for reading or writing by a user.

5. The method of claim 4, wherein the screen-processing is executed in a test process.

6. The method of claim 1, further comprising executing a defect compensation process by reallocating a sector classified as a first type defect sector to a spare sector of the recording medium or by correcting an off-track for a sector classified as a second type defect sector, and rewriting information written in the sector classified as the second type defect sector.

7. The method of claim 6, wherein the defect compensation process is executed in a user environment.

8. The method of claim 6, wherein correcting the off-track for the sector classified as the second type defect sector comprises:
   measuring an off-track amount in the sector classified as the second type defect sector; and
   correcting an off-track for the sector with the measured off-track amount.

9. A method of processing a defect contained in a recording medium of a data storage apparatus, the method comprising:
   during an idle mode of the data storage apparatus, reading information from a region of the recording medium in which a write command has been executed;
   detecting a number of error-corrected error correction code (ECC) symbols in each of a plurality of sectors of the recording medium based on the information read from the recording medium;
   classifying a sector whose number of error-corrected ECC symbols is greater than a first threshold value as a first type defect sector;
   calculating moving averages of the numbers of error-corrected ECC symbols in units of a predetermined number of sectors; and
   classifying groups of sectors that have a moving average greater than a second threshold value as second type defect sectors.

10. The method of claim 9, wherein reading the information from the region of the recording medium in which the write command has been executed comprises reading the information in units of tracks and simultaneously from entire sectors of each track.

11. The method of claim 9, further comprising executing a defect compensation process by reallocating the sector classified as a first type defect sector to a spare sector or by correcting an off-track for a sector classified as a second type defect sector, and rewriting information written in the sector determined as the second type defect sector.

12. A data storage device, comprising:
   a recording medium for storing data;
   a media interface for accessing the recording medium; and
   a processor configured to control the media interface to read information from the recording medium, generate information regarding a number of error-corrected error correction code (ECC) symbols in each of a plurality of sectors of the recording medium based on the information read from the recording medium, classify defect sectors of the recording medium as either hard defect sectors or track non-uniformity (TNU) sectors according to a criteria based on the information regarding the number of error-corrected ECC symbols in each sector, and execute a defect processing operation according to the defect sector classifications.

13. The data storage device of claim 12, wherein the processor classifies sectors having a number of error-corrected ECC symbols greater than a first threshold value as a hard defect sector, calculates moving averages of the numbers of error-corrected ECC symbols in groups of sectors, and classifies sectors in groups having a moving average greater than a second threshold value as TNU sectors.

14. The data storage device of claim 12, wherein the processor controls the media interface to perform an ECC scan operation to read the information from the recording medium in units of tracks and simultaneously from entire sectors of each track.

15. The data storage device of claim 12, wherein, in a test process of the data storage device, the processor adds a sector classified as either a hard defect sector or a TNU sector to a defect list to make the sector inaccessible for reading or writing by a user, and controls the media interface to store the defect list in the recording medium.

16. The data storage device of claim 12, wherein, in a user environment, the processor controls the media interface to reallocate a sector classified as a hard defect sector to a spare sector of the recording medium, and to correct an off-track for a sector classified as a TNU sector and execute rewriting of information written in the sector classified as the second type defect sector.

17. The data storage device of claim 12, wherein the recording medium comprises a magnetic disk.

18. The data storage device of claim 12, wherein the processor comprises:
   an ECC processing unit configured to detect error-corrected ECC symbols in the information read from the recording medium to generate information regarding the number of error-corrected ECC symbols in each sector of a track of the recording medium;
   a buffer configured to store the information regarding the number of error-corrected ECC symbols in each sector of the track;
   a first determination unit configured to compare the information regarding the number of error-corrected ECC symbols with a first threshold value and to classify sectors having a number of error-corrected ECC symbols greater than the first threshold value as hard defect sectors;
   a moving average calculation unit configured to calculate a moving average of the numbers of error-corrected ECC symbols;
   a second determination unit configured to compare the information regarding the moving averages with a second threshold value to classify sectors in groups of sectors having a moving average greater than the second threshold value as TNU sectors, wherein the second threshold value is smaller than the first threshold value; and
   a defect control unit configured to control the media interface to add sectors classified as either hard defect sectors or TNU sectors to a defect list to make the sectors inaccessible for reading or writing by a user, or to reallocate sectors classified as hard defect sectors to a spare sector of the recording medium, in order to correct an off-track for sectors classified as TNU sectors and execute rewriting information written in sectors classified as TNU sectors.

19. The data storage device of claim 12, wherein, during an idle mode of the data storage device, the processor reads information written in a region of the recording medium in which a write command has been executed to detect the number of error-corrected ECC symbols in each of the sectors, classifies the sectors as either hard defect sectors or TNU sectors according to a criteria based on the information regarding the number of error-corrected ECC symbols in each sector, and executes the defect processing operation according to the defect sector classifications.

20. The data storage device of claim 12, wherein the ECC symbols are generated by Reed Solomon coding.

* * * * *